United States Patent [19]

Osaka et al.

[11] Patent Number: 5,234,870
[45] Date of Patent: Aug. 10, 1993

[54] ZIRCONIA SOL AND METHOD FOR PRODUCTION THEREOF

[75] Inventors: Shigemi Osaka; Kazuo Hata; Tsukasa Takahashi; Teruyuki Moto, all of Himeji, Japan

[73] Assignee: Nippon Shokubai Kagaku Kogyo Co., Ltd., Osaka, Japan

[21] Appl. No.: 554,867

[22] Filed: Jul. 20, 1990

[30] Foreign Application Priority Data

Jul. 21, 1988 [JP] Japan ................................. 1-187263
Dec. 1, 1989 [JP] Japan ................................. 1-310560
Jan. 25, 1990 [JP] Japan ................................. 2-13665

[51] Int. Cl.$^5$ ................................................ C04B 35/48
[52] U.S. Cl. ........................................ 501/12; 501/103; 252/309; 423/608
[58] Field of Search .............................. 501/12, 103; 252/315.01, 313.1, 309; 423/608

[56] References Cited

U.S. PATENT DOCUMENTS

| 3,741,782 | 3/1973 | Stewart et al. | 106/162 |
| 4,512,913 | 4/1985 | Ritter | 252/313.1 |
| 4,778,671 | 10/1988 | Wusirika | 423/592 |
| 4,784,794 | 11/1988 | Kato | 252/313.1 |

FOREIGN PATENT DOCUMENTS

| 0262579 | 7/1986 | European Pat. Off. . |
| 0253552 | 7/1987 | European Pat. Off. . |
| 0235552 | 1/1988 | European Pat. Off. . |
| 0366934 | 5/1990 | European Pat. Off. . |
| 2088550 | 5/1971 | France . |
| 52-38541 | 9/1977 | Japan . |
| 52-38542 | 9/1977 | Japan . |
| 61-44717 | 4/1988 | Japan . |

Primary Examiner—Mark L. Bell
Assistant Examiner—Chris Gallo
Attorney, Agent, or Firm—Burns, Doane, Swecker & Mathis

[57] ABSTRACT

A zirconia sol, comprising a transparent zirconia sol obtained by hydrolysis of zirconyl ammonium carbonate and a chelating agent incorporated in said transparent zirconia sol.

29 Claims, No Drawings

ZIRCONIA SOL AND METHOD FOR PRODUCTION THEREOF

BACKGROUND OF THE INVENTION

1. Field of the Invention

This invention relates to a zirconia sol and a method for the production thereof. More particularly, it relates to a zirconia sol stable in the neutral to alkaline regions and a method for the production thereof.

2. Description of the Prior Art

Among the conventional methods for the production of a zirconia sol from the aqueous solution of a zirconium salt, the method which comprises causing the aqueous solution of a zirconium salt to react with a basic substance thereby forming a precipitate and deflocculating the precipitate with an acid and the method which comprises pouring a basic substance into the aqueous solution of a zirconium salt to a pH value not enough to induce a precipitate and mixing them thereby forming a sol have been renowned. Further, the method which produces a zirconia type colloid sol by hydrolyzing an aqueous solution containing a zirconium salt by application of heat under normal pressure or under increased pressure have been known to the art.

The species of zirconia sol which are produced by the conventional methods described above are invariably stable only in the acidic regions of pH. In the neutral to alkaline regions of pH, they suffer from increase of viscosity or undergo gelation and can be no longer used as sol. A slurry which possesses stability to withstand aging or exhibits low viscosity cannot be prepared by mixing the conventional zirconia sol stable only in the acidic region of pH with the powder of calcium oxide, magnesium oxide, or other similar base, a composite powder using such salts as components thereof, or a powder containing such salts as impurities. When the conventional zirconia sol is applied as a coating agent to a metallic material, it is not easily used safely because of the problem of corrosion of the metallic material by the acid present in the sol. In the circumstances, a desire has been expressed for a zirconia sol which is stable in the neutral to alkaline regions of pH.

Where a zirconium component is required in the alkaline region, an alkaline zirconium salt such as, for example, zirconyl ammonium carbonate or zirconyl potassium carbonate is used. Particularly, the aqueous solution of zirconyl ammonium carbonate itself or the aqueous solution obtained by hydrolyzing the aqueous solution of zirconyl ammonium carbonate by the application of heat or the addition of an acidic substance possesses the function of a zirconia sol to some extent, it has found utility as in an inorganic binder. This sol which ought to be called a zirconyl ammonium carbonate sol contains ammonium ion and carbonic acid ion in large amounts. The sol obtained by thermal hydrolysis of the aqueous solution of zirconyl ammonium carbonate undergoes gelation during the application of heat and is produced barely in a low concentration. Thus, the sol has inferior strength for an inorganic binder or a coating agent. It further has the disadvantage that it shrinks in a large ratio after a heat treatment.

As described above, the species of zirconia sol obtained by the conventional methods have the problem of poor stability in the neutral to alkaline regions of pH. Though the zirconyl ammonium carbonate is stable in the alkaline region of pH, the aqueous solution thereof or the sol obtained by hydrolysis of the aqueous solution and rightfully designated as a zirconyl ammonium carbonate sol requires for stabilization thereof large amounts of ammonium ion and carbonic acid ion and, therefore, has the problem of persistence of these ions as impurities in the product aimed at.

For the formation of a zirconia coating, various methods represented by such physicochemical methods as vacuum deposition and spattering and the method which comprises applying a coating of a zirconium-containing liquid composition to a surface have been employed. Among the methods mentioned above, the method which resorts to the application of a coating permits relatively easy commercialization on large surfaces and, therefore, has been the subject of study at various research institutes in recent years.

The conventional zirconium-containing liquid compositions of the organic solvent type have used zirconium alkoxides as a substratal component thereof. Unfortunately, zirconium alkoxides undergo hydrolysis very rapidly. The coating liquid of such a liquid composition, therefore, is unstable, deficient in stability to withstand aging during storage, and susceptible to hydrolysis by moisture and carbon dioxide gas present in the air. Thus, it allows preparation of a uniform coating composition only with difficulty. For the same reason, the coating liquid limits the coating conditions greatly and suffers from poor workability and permits formation of a coating devoid of pinholes only with difficulty. As a solution to the problem, the coating composition incorporating therein a hydrolysis-inhibiting agent such as the zirconium alkoxide of a glycol or the zirconium compound obtained by the combination of a zirconium alkoxide and a $\beta$-dicarbonyl compound such as the ester of $\beta$-diketone or $\beta$-ketone has been used as a coating liquid composition. The coatings which are obtained by these methods, however, are liable to suffer from cracking and uneven wall thickness and allow formation of coatings of uniform quality only with difficulty.

An object of this invention, therefore, is to provide a zirconia sol which is stable over a wide range of pH, particularly stable in the neutral to alkaline regions of pH and transparent in appearance.

Another object of this invention is to provide a zirconia sol which exhibits stability in the neutral to alkaline regions of pH, contains ions as impurities only in small amounts, and enjoys high purity and transparency of appearance.

A further object of this invention is to provide a zirconia sol which exhibits stability in the neutral to alkaline regions, contains ions as impurities only in small amounts, and enjoys high purity, a high zirconia concentration, and transparency of appearance.

Yet another object of this invention is to provide a zirconia sol dispersed in an organic solvent.

SUMMARY OF THE INVENTION

The objects described above are accomplished by a zirconia sol having a chelating agent incorporated in a transparent zirconia sol obtained by the hydrolysis of zirconyl ammonium carbonate.

These objects are further accomplished by a zirconia sol obtained by the hydrolysis of the reaction product of zirconyl ammonium carbonate with a chelating agent.

These objects are further accomplished by a zirconia sol dispersed in an organic solvent, obtained by adding an organic solvent to a water-dispersed zirconia sol and displacing the organic solvent with water.

These objects are further accomplished by a method for the production of a zirconia sol, which in the formation of a transparent zirconia sol by the hydrolysis of zirconyl ammonium carbonate comprises adding to the reaction mixture a chelating agent at a desired time between the time preceding the formation of the sol and the time following the formation of the sol.

These objects are further accomplished by a method for the production of a zirconia sol, which comprises hydrolyzing under application of heat the reaction product of zirconyl ammonium carbonate with a chelating agent.

These objects are further accomplished by a method for the production of a zirconia sol dispersed in an organic solvent, which comprises preparing a zirconia sol from the aqueous solution of a zirconium salt and urea or a zirconia sol by the hydrolysis of the reaction product of zirconyl ammonium carbonate with a chelating agent, adding an organic solvent to the zirconia sol, and displacing the organic solvent with water by subjecting the resultant mixed solvent-dispersed zirconia zol to distillation or to a treatment with an ultrafiltration membrane.

EXPLANATION OF THE PREFERRED EMBODIMENT

Now, the present invention will be described in detail below.

Zirconyl ammonium carbonate is generally obtained by the reaction of zirconyl carbonate with an alkali carbonate such as, for example, ammonium carbonate or ammonium hydrogen carbonate.

$$2ZrOCO_3 \cdot 8H_2O + 4NH_4HCO_3 + (NH_4)_2CO_3 \longrightarrow$$

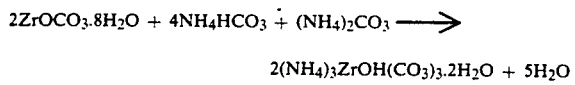

$$2(NH_4)_3ZrOH(CO_3)_3 \cdot 2H_2O + 5H_2O$$

The zirconyl ammonium carbonate, by being dissolved in pure water, is transformed into an aqueous solution of zirconyl ammonium carbonate. The aqueous solution of zirconyl ammonium carbonate is not easily defined uniquely because the reaction mentioned above necessitates use of the alkali carbonate in an excess amount, because the zirconyl ammonium carbonate possesses complicated structure, and because the behavior of the zirconyl ammonium carbonate in the aqueous solution has numerous points yet to be elucidated. In the present invention, it is defined as what is generally referred to as "aqueous solution of zirconyl ammonium carbonate." Thus, a commercially available aqueous solution of zirconyl ammonium carbonate can be used advantageously in the present invention.

When the aqueous solution of zirconyl ammonium carbonate is heated at a temperature exceeding 60° C., the zirconyl ammonium carbonate is hydrolyzed with evolution of such gases as ammonia and carbon dioxide gas and consequently transformed into hydrated zirconia. The resultant reaction solution possesses an alkaline pH value and exhibits the quality of a sol. When this reaction is continued, however, the reaction solution gains in viscosity and induces gelation in a relatively short span of time. Thus, the reaction cannot be continued any further and produces zirconium carbonate only in a low conversion.

For the preparation of a zirconia sol of the present invention from zirconyl ammonium carbonate, therefore, (1) the method which comprises hydrolyzing the aqueous solution of zirconyl ammonium carbonate, separating zirconia sol particles from the hydrolyzate by the use of an ultrafiltration membrane, and washing the separated zirconia sol particles, (2) the method which comprises causing zirconyl ammonium carbonate with a chelating agent and hydrolyzing the resultant reaction product thereby heightening the conversion of zirconyl ammonium carbonate substantially to 100%, etc. are available.

Now, these methods will be described further in detail below.

(I) Method Resorting to Hydrolysis of Aqueous Solution of Zirconyl Ammonium Carbonate As already described above, in the hydrolysis of the aqueous solution of zirconyl ammonium carbonate, since the reaction solution induces the phenomena of increase of viscosity and gelation in consequence of the advance of the reaction, it is necessary to keep the concentration of zirconyl ammonium carbonate at a relatively low level and bring the reaction to termination in a short span of time.

Properly, the concentration of the aqueous solution of zirconyl ammonium carbonate in the present invention is approximately in the range of 0.05 to 1 mol/liter, preferably 0.1 to 0.5 mol/liter. If this concentration is unduly low, the method is not economical. Conversely, if the concentration is unduly high, there arises the disadvantage that the phenomena of increase of viscosity and gelation of the reaction solution are rapidly induced during the course of the reaction.

The zirconyl ammonium carbonate is heated to a temperature exceeding 60° C. to be hydrolyzed. If the reaction is continued for a long time, the sol particles formed in the reaction solution are polycondensed to the extent of pacifying the reaction solution and giving rise to a precipitate therein. To ensure production of a transparent zirconia sol of this invention, it is necessary to terminate the reaction while the reaction solution retains transparency. In the present invention, the reaction temperature is set in the range of 60° to 120° C., preferably 80° to 120° C., and the reaction time in the range of 0.01 to 2 hour, preferably 0.03 to 1 hour. As regards the form of reaction, though the reaction may be carried out batchwise as generally practiced, it is properly performed by the flow method in which the retention time of the product and other reaction conditions are uniform. The reaction vessel to be used may be in the form of a tank or a tube.

The reaction solution obtained by the hydrolysis described above is cooled rapidly, treated with an ultrafiltration membrane, and washed to remove the unaltered zirconyl ammonium carbonate and ions formed by the reaction and obtain a zirconia sol of high concentration.

The impurities in the sol are expelled together with water from the system. The concentrated sol is continuously washed by addition of pure water. During the course of this washing, the sol concentration is preferable to be retained in the range of 1 to 15% by weight. By selecting the permeating pore structure in the ultrafiltration membrane, the washing and concentration of the sol can be attained without substantial loss of sol particles. After the washing, the sol is concentrated approximately to a level in the range of 5 to 20% by weight as zirconia. If it is concentrated to a level exceeding the upper limit, there is the possibility that the sol will gain in viscosity or undergo gelation and clog the permeating pores in the ultrafiltration membrane.

The zirconia sol washed and concentrated by the use of the ultrafiltration membrane can be further concentrated by heating. Since the zirconia sol tends to lose stability and gain in susceptibility to gelation in accordance as it gains in concentration, and when further concentration i.e., washing by using ultrafiltration membrane, concentration, and concentration by heating is carried out, it is preferable to be carried out in the presence of a chelating agent. This heating for the further concentration is performed at a temperature not exceeding 80° C., desirably not exceeding 60° C., and more desirably not exceeding 40° C. The further concentration by this heating can be effected efficiently by keeping the sol stirred under a vacuum. By this heating, the concentration of the zirconia sol can be increased approximately to a level of 30% by weight.

The chelating agents which can be effectively used in the present invention include oxyphenols such as catechol and pyrogallol; amino alcohols such as diethanol amine and triethanol amine: oxyacids such as glycolic acid, citric acid, tartaric acid, lactic acid, mandelic acid, malic acid, and hydroxyacrylic acid; methyl, ethyl, hydroxyethyl, and other similar esters of the oxyacids; oxyaldehydes such as glycol aldehyde: polycarboxylic acids such as oxalic acid and malonic acid; amino acids such as glycine and alanine; $\beta$-diketones such as acetyl acetone, stearoyl acetone, stearoyl benzoyl methane, and dibenzoyl methane and $\beta$-ketonic acids such as acetoacetic acid, propionyl acetic acid, and benzoyl acetic acid and methyl, ethyl, n-propyl, isopropyl, n-butyl, t-butyl and other similar esters of such $\beta$-diketones and $\beta$-ketonic acids, for example. One member or a combination of two or more members selected from the group of chelating agents mentioned above can be used. Among other chelating agents enumerated above, oxyacids such as glycolic acid, citric acid, tartaric acid, lactic acid, mandelic acid, malic acid, and hydroxyacrylic acid and $\beta$-diketones such as acetyl acetone prove to be particularly desirable. Still more desirable chelating agents are alpha, beta, and gamma-oxyacids. To be specific, they are alpha-, beta-, and gamma-ketonic acids possessing functional groups containing an oxygen atom on the carbon of alpha, beta, and gamma and the esters of such ketonic acids.

The amount of the chelating agent to be used, though variable with the kind of chelating agent, is preferable to be such that the chelating agent (mol number)/zirconia (mol number) falls in the range of 0.02/1 to 4/1, preferably 0.1/1 to 3/1, and more preferably 0.5/1 to 2/1.

If this ratio is unduly small, the effect of the addition of this chelating agent is absent. Conversely, if the ratio exceeds 4/1, the use of the chelating agent is uneconomical because the effect is not proportionately increased.

The incorporation of the chelating agent is effective in stabilizing the concentration by heating of the zirconia sol described above and in stabilizing a zirconia type sol containing in zirconia sol the salt or sol of a metal other than zirconium as well. When zirconia sol contains the aforementioned metal seed of a metal other than zirconium, it is more often than devoid of stability to withstand aging even when the concentration of zirconia is low. A zirconia type sol stable to withstand aging can be easily prepared by combining a zirconia sol of relatively low concentration obtained after ultrafiltration with a chelating agent or by adding the metal seed of a metal other than zirconium to a highly concentrated zirconia sol obtained by thermally concentrating a zirconia sol containing a chelating agent. The metal seeds other than zirconium which can be added in the zirconia type sol include compounds of vanadium, niobium, tantalum, chromium, molybdenum, and tungsten which have a higher valency than zirconium, titanium, tin, silicon, and cerium which have the same valency as zirconium, and aluminum, yttrium, indium, calcium, and magnesium which have a smaller valency than zirconium. When one member or a mixture of two or more members selected from the group of metallic elements mentioned above is used in combination with zirconia, mechanical, electromagnetic, and optical functions may be imparted or enhanced as compared with the sole use of zirconia.

(II) Method Resorting to hydrolysis of Reaction Product of Zirconyl Ammonium Carbonate With Chelating Agent This method comprises mixing an aqueous solution of zirconyl ammonium carbonate with a chelating agent thereby transforming zirconyl ammonium carbonate temporarily into a zirconium-chelate compound, then thermally hydrolyzing the chelate compound, and subsequently optionally subjecting the resultant hydrolyzate to filtration and washing by the use of an ultrafiltration membrane. In the hydrolysis of the aqueous solution of zirconyl ammonium carbonate, the reaction solution induces increase of viscosity and gelation in a relatively short span of time when the reaction is continued and, consequently, the hydrolysis of zirconyl ammonium carbonate is attained only to a small extent. The present method is the fruit of a diligent study performed in search of a method capable of stably continuing the hydrolysis of zirconyl ammonium carbonate. This invention resides in a method for obtaining a zirconia sol, which comprises mixing an aqueous solution of zirconyl ammonium carbonate with a chelating agent thereby preparatorily forming the reaction product of zirconyl ammonium carbonate and the chelating agent and then heating the aqueous solution containing the reaction product to a temperature exceeding 60° C. Specifically, when an aqueous solution of zirconyl ammonium carbonate is placed in a stirring tank type reaction vessel and a chelating agent is added to the aqueous solution kept stirred therein, the zirconyl ammonium carbonate rapidly reacts with the chelating agent at room temperature.

When the resultant reaction solution is heated to a temperature above 60° C., the reaction product of zirconyl ammonium carbonate with the chelating agent is hydrolyzed with evolution of a gas formed mainly of carbon dioxide and ammonia. During the course of the hydrolysis, the reaction solution does not gain in viscosity but retains transparency until the reaction is completed. After the reaction, the reaction solution exhibits a weakly alkaline to neutral pH value. When an alkaline substance is added to this reaction solution, the reaction solution does not induce such phenomena as increase of viscosity and gelation. Since the zirconyl ammonium carbonate is substantially completely decomposed during the course of the hydrolsys, the reaction solution contains substantially no unaltered zirconyl ammonium carbonate. The reaction solution contains impurities only in very low concentrations because such unwanted ions as ammonium ion and carbonic acid ion are gassified and expelled from the system during the course of the reaction. This reaction reaction, therefore, is used as the zirconia sol aimed at by the present invention. The impurities persisting, though in small amounts, in the reaction solution can be efficiently removed by a method similar to the aforementioned method of filtration and washing by the use of an ultrafiltration membrane. Thus, the zirconia sol can be obtained with still higher purity.

The zirconyl ammonium carbonate and the chelating agent to be used in the present method are identical to those which are used in the method of (1) which resorts to hydrolysis of an aqueous solution of zirconyl ammonium carbonate.

This method of the present invention does not specifically restrict the concentration of zirconyl ammonium carbonate. The production of the zirconia sol is attained economically advantageously when this concentration is higher than when it is lower. With due respect to the stability of the aqueous solution of zirconyl ammonium carbonate to withstand aging, however, the concentration is desired to be in the range of 10 to 25% by weight as $ZrO_2$.

The amount of the chelating agent to be used in the present method is the same as in the method resorting to hydrolysis of zirconyl ammonium carbonate. To be specific, it is preferable to be selected so that the chelating agent (mol number)/zirconia(mol number) is in the range of 0.02/1 to 4/1, preferably 0.1/1 to 3/1, and more preferably 0.5/1 to 2/1.

If the amount of the chelating agent to be used is unduly small, organic zirconium salts of certain type formed by the reaction of the zirconyl ammonium carbonate with the chelating agent, on being hydrolyzed by the method of this invention, exhibits the same behavior as when zirconyl ammonium carbonate is subjected all by itself to hydrolysis. Thus, the hydrolysis can be continued no longer and the use of the chelating agent is effectless. Conversely, if the amount exceeds 4/1, the chelating agent is used uneconomically because the effect thereof is not proportionately increased.

For the present method, it suffices to perform the hydrolysis at a temperature above 60° C. This reaction is accelerated when it is performed in an atmosphere of increased pressure. The practical reaction temperature is in the range of 60° to 300° C., preferably 90° to 120° C.

Since the zirconia sol obtained by the method of this invention is stabilized with the chelating agent, it is characterized by exhibiting outstanding stability to withstand agent even when it is concentrated to a high degree or when it is combined with a metal seed other than zirconium for the preparation of a zirconia type sol. When the reaction solution resulting from the hydrolysis is subjected to filtration and washing by the use of an ultrafiltration membrane, it can be washed efficiently even in a highly concentrated state. By the use of the ultrafiltration membrane, the concentration of the sol can be increased up to 35% by weight as $ZrO_2$. The reaction solution resulting from the hydrolysis and the sol purified to a high concentration by the use of the ultrafiltration membrane can be easily concentrated further by the conventional heat treatment. Thus, the zirconia sol can be obtained as concentrated to a level of about 45% by weight as $ZrO_2$.

The zirconia type sol can be prepared by adding the salt or sol of a metal other than zirconium to the zirconia sol obtained as described above. It is put to use optionally in a concentrated state or diluted state. The metal seed to be added to the zirconia type sol and the functions fulfilled thereby are the same as those in the zirconia type sol obtained from the aqueous solution of zirconyl ammonium carbonate described above.

The zirconia sol obtained by the present method can be transformed into a powder of zirconia sol particles by being dried at a temperature above 80° C. This powder can be reverted to a transparent zirconia sol by being dissolved in a liquid such as water or an organic solvent. This property is particularly useful for the purpose of transforming a sol in an aqueous solvent into a sol in an organic solvent as successfully attained in the case of the sol produced by the present invention. Generally where a sol is used as combined with a coating agent or an organic polymeric compound, the sol is required more often than not to be used as dissolved in an organic solvent. In the case of a sol dissolved in water, the displacement of the water with an organic solvent is attained by adding the organic solvent to the aqueous sol and distilling the resultant mixture by heating or filtering the mixture with an ultrafiltration membrane thereby expelling the water as a distillate or a filtrate. As compared with this method, the method of the present invention is advantageous in respect that the operation is simple and the water content in the sol can be lowered to a greater extent because of the displacement with the organic solvent.

The zirconia sol having the chelating agent incorporated in the zirconia sol obtained by the hydrolysis of an aqueous solution of zirconyl ammonium carbonate as the starting material and the zirconia sol obtained by the hydrolysis of the reaction product of zirconyl ammonium carbonate with the chelating agent are invariably a transparent zirconia sol having a weakly alkaline to neutral pH value. Even when they are used at a pH value in the range of 6 to 14, they induce no gelation and retain highly satisfactory stability for a long time.

The sol particles of the zirconia sols produced by the two methods of the present invention are amorphous. The sols are transparent even in a highly concentrated state. These are clear indications that the sol particles have extremely small diameters. The zirconia sol of the present invention, by virtue of the property that it exhibits high stability in a wide range of pH, particularly in the neutral to alkaline regions, finds utility as coating agents, inorganic binders, or composite materials of organic or inorganic compounds with zirconia.

It is more preferably that the two species of zirconia sol obtained by the present invention should be used in two discriminate sorts of applications. The zirconia sol obtained by hydrolyzing an aqueous solution of zirconyl ammonium carbonate and then subjecting the hydrolyzate to filtration and washing by the use of an ultrafiltration membrane and the zirconia sol having a chelating agent incorporated in the aforementioned zirconia sol are used in a state of relatively low concentration, particularly advantageously as a coating agent for materials of glass and metal. In the coating of these materials, the coating agent is generally applied in a stratified form. In this case, when a freshly applied layer of this coating agent is dried at a low temperature and the next layer of the coating agent is superposed on the dried layer, the underlying layer of the coating agent is not dissolved out partly because the zirconia sol is in a highly purified state. Thus, the coating agent can be applied in a large number of layers to give rise to a coating of large thickness with ease. When the coating produced as described above is heat-treated at a temperature of at least 400° C., for example, there is formed a dense transparent coating layer of crystalline texture.

The zirconia sol obtained by hydrolyzing the reaction product of zirconyl ammonium carbonate with a chelating agent is used in a relatively highly concentrated state. It is used as a starting material for inorganic binders and molded articles of zirconia obtained by transforming the sol into a gel and heat-treating the gel such as, for example, porous sheets and fibers of zirconia. It is used particularly advantageously as a binder of basic type zirconia among other types of inorganic binder. This zirconia sol can be transformed into a stable slurry by being mixed with a basic powder such as of calcium oxide, calcium carbonate, or magnesium oxide or with a powder containing such basic powder. This slurry is used as a binder for molds, as inorganic coating materials, etc.

The method for the formation of a zirconia coating film in accordance with the present invention comprises a step for preparing a coating solution, a step for forming a coating film, a step for drying and gelding the applied coating film, and a step for transforming the gel film into a zirconia film by a heat treatment. In the coating effected by the solution method as contemplated by this invention, the preparation of the coating solution constitutes a basically important task. In the present invention, the zirconia sol obtained by forming a zirconia sol preparatorily in an aqueous solvent and subsequently displacing the aqueous solvent with an organic solvent is used as a main component for the coating solution. Zirconia occurs in monoclinic, tetragonal, and cubic crystal systems. It generally forms a monolitic system which is a stable phase approximately at temperatures above 600° C. The crystallizing temperature and the crystal system of zirconia are affected by the kind of starting material, the method of reaction, and the method of heat treatment used for the gel, for example. This invention is based on the knowledge that an organic solvent-dispersed zirconia sol produced by preparatorily synthesizing in an aqueous solvent a zirconia sol capable of crystallization and densification at low temperatures and subsequently displacing the water with an organic solvent for the impartation of characteristics necessary for a coating solution forms a coating film aimed at by the present invention. Now, it will be described further in detail below.

As a way of producing a zirconia sol from an aqueous solution of zirconium salt, the method which comprises causing the aqueous solution of zirconium salt to react with a basic substance and deflocculating the consequently formed precipitate with an acid or the method which comprises pouring a basic substance into the aqueous solution of zirconium salt until a pH value not enough to induce precipitation thereby giving rise to a sol has been known to the art. Further, the method which comprises hydrolyzing by heating an aqueous solution containing a zirconium salt under normal pressure or under application of pressure thereby obtaining a zirconia type colloid sol has been known to the art. The sols produced by these methods are subsequently deprived of ions entrained by their solutions.

For the zirconia coating film to be crystallized at a low temperature, the shape and diameter of the sol particles and the uniformity of their particle diameters are very important and the preparation of a zirconia sol of the optimum quality is important. The present inventors have made a diligent study in search of a method for the preparation of a zirconia sol to find that the acidic type and neutral type zirconia sols prepared by the following methods satisfy the essential purpose of the present invention.

Acidic Type Zirconia Sol and Method For Preparation Thereof

This acidic type zirconia sol is a transparent zirconia sol which is produced from an aqueous solution of zirconium salt and urea. The method used for this preparation will be described in detail below.

A zirconia sol is produced by first adding urea to an aqueous solution of a zirconium salt selected from among such water-soluble zirconium salts as zirconium oxychloride, zirconium nitrate, zirconium sulfate, and zirconium acetate and then heating the resultant mixture.

This reaction is characterized by the fact that since the ammonia produced by the hydrolysis of urea represented by the following formula has an extremely uniform concentration, the particles of zirconia sol produced from ammonia and a zirconium salt are extremely minute and uniform.

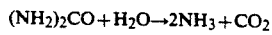

$$(NH_2)_2CO + H_2O \rightarrow 2NH_3 + CO_2$$

The reaction is stopped while the sol so produced retains transparency.

At the end of this reaction, the sol has a pH value in the range of 1.2 to 2.9.

The sol is cooled and the subjected to washing and concentration by the use of an ultrafiltration membrane. The ions present in the sol are expelled in conjunction with water from the system. When such ions are present in high concentrations in the sol after the concentration, the step of washing the sol with pure water and concentrating the washed sol is repeated until the concentrations of ions fall to desired levels. For the removal of ions from the sol, the method which comprises washing the sol by ultrafiltration until the ion concentrations fall to prescribed levels and thereafter removing the residual ions by the use of an ion-exchange resin proves to be most effective. The concentration with an ultrafiltration membrane, though subject to restriction due to the quality of the ultrafiltration membrane, can be effected up to 20% by weight as $ZrO_2$. For a higher concentration, the sol is concentration by heating. This concentration by heating is required to be carried out at a temperature below 80° C., preferably below 60° C., and more preferably below 40° C. This concentration can be effected efficiently by keeping the sol stirred under a vacuum. The transparent zirconia sol can be so produced in concentrations up to 50% by weight and it is stable for a long time.

When the zirconia sol is used as a coating film of large thickness or an inorganic binder of high strength, it is advantageously used in a high concentration as $ZrO_2$. When it is used as a coating agent or an inorganic binder at a high temperature, it is required to incorporate therein as a stabilizer a compound of calcium, magnesium, or yttrium, for example, for the purpose of precluding a possible change in volume due to phase change of zirconia. The zirconia sol is required to incorporate therein a compound of a metallic element other than zirconium when it is desired to be improved in mechanical properties such as hardness and adhesive strength of a coating film, in electromagnetic properties such as electric resistance, antistatic property, and resistance to electromagnetic waves, and in optical properties such as light absorbance and refractive index as compared with zirconia as a simple substance. The zirconia sol which is produced by the method described above has the possibility of gaining in viscosity, losing stability to withstand aging, and undergoing gelation when it has such a high concentration as described above or it coexists with a compound of other metallic element. In this case, the viscosity can be adjusted and the stability to withstand aging can be improved to some extent by adjusting the pH value of the sol. The effect of this adjustment of the pH value is not sufficient. The prevent inventors have continued a study on this problem, to find that by incorporating a chelating agent in the aforementioned transparent zirconia sol, the adjustment of the sol viscosity and the impartation of lasting stability to the sol can be realized even in the zirconia type sol having a high concentration or having a compound of a metal other than zirconium incorporated therein.

The zirconium type sol obtained by combining a chelating agent and a compound of a metallic element other than zirconium with a transparent zirconium obtained from an aqueous solution of a zirconium salt and urea in the same manner as described above finds utility in a distinctly widened range of applications as compared with the zirconia sol. Now, the method for the preparation of the zirconium type sol will be described below.

The chelating agents which are effectively used herein are the same as those described above.

The chelating agent manifests its effect sufficiently in a relatively small amount, specifically in the range of 0.02 to 1 mol per mol of zirconia in the sol. If it is used in an amount exceeding the upper limit of the range mentioned above, the excess is wasted without manifesting any appreciable effect.

The compounds of metallic elements which are used herein are the same as those described above.

The time and method of the addition of the chelating agent and the compound of metallic element are not particularly limited. The addition may be made at a desired time between the time preceding the formation of the transparent zirconia sol and the time following the formation. For example, this addition may be made (1) after the transparent zirconia is formed by heating the aqueous solution of a zirconium salt and urea, (2) after the transparent zirconia sol is concentrated with an ultrafiltration membrane, or (3) after the transparent zirconia sol is concentrated by ultrafiltration and further concentrated by heating. Alternatively, the addition may be made (4) during the formation of a mixed liquid of an aqueous solution of a zirconium salt with urea. In this case, since the components can be uniformly mixed before the reaction for the formation of the sol, the zirconia type sol can be obtained with higher degree of homogeneity and even a sol formed of composite particles of zirconia with other component can be produced.

The zirconia type sol thus obtained is stable for more than 6 months at room temperature even in a highly concentrated state.

Neutral Type Zirconia Sol and Method For Preparation Thereof

The zirconia sols which are produced by the conventional methods from an aqueous solution of a zirconium salt are invariably stable only in the acidic region of pH and are susceptible to increase of viscosity and gelation in the neutral to alkaline regions of pH. They cannot be used, therefore, in the presence of an alkaline substance. When the sol is formed in an aqueous solvent and the water is displaced with an organic solvent as contemplated by the present invention, the water content is not allowed to be generously lowered or the kinds of organic solvents usable for the displacement are limited to a great extent because the sol has the possibility of inducing increase of viscosity and undergoing gelation in consequence of the decrease in the water content. Further, when the zirconia sol is used as a coating agent and applied to a metallic material, it entails the problem of corrosion of the metallic material by the acid component remaining in the sol.

The neutral type zirconia sol has been invented for the purpose of coping with the problem mentioned above. This zirconia sol is stable in a wide pH range, specifically in the neutral to alkaline regions of pH. This sol is obtained by mixing an aqueous solution of zirconyl ammonium carbonate with a chelating agent thereby preparatorily transforming the zirconyl ammonium carbonate into a zirconium chelate compound, then thermally hydrolyzing the chelate compound, and subsequently subjecting the hydrolyzate to filtration and washing, as occasion demands, by the use of an ultrafiltration membrane. This method of production is as already described.

The aforementioned acidic type and neutral type zirconia sols which are aqueous solvents are used by themselves as coating agents and inorganic binders, for example. When such a sol is used as a coating agent, for example, the gel film formed by applying the coating agent is crystallized by a heat treatment performed at a temperature approximately above 360° C. The temperature of the heat treatment for crystallizing the zirconia sol, the kind of crystals, the diameters of the crystals, etc. are affected by the method of preparation of zirconia sol, the starting materials, the shape of sol particles, the diameters of sol particles, and the conditions of the heat treatment such as atmospheric conditions. The two species of zirconia sol of the present invention may be used either in two discriminate sorts of applications or alternately or simultaneously in common applications.

When the zirconia sol is used as a coating agent, it is generally used with the water component thereof displaced with an organic solvent by reason of adjustment of the speed of drying of the coating film and the fastness of adhesion to the substrate. For this displacement, the method which comprises adding an organic solvent to the zirconia sol obtained in an aqueous solvent by the aforementioned method and thermally distilling the resultant mixed solution thereby expelling the water or the mixture of water with the organic solvent from the system and, at the same time, transforming the zirconia sol in the aqueous sol to that in the organic solvent or the method which comprises treating the same mixed solution as prepared above with an ultrafiltration membrane thereby expelling water and the organic solvent from the system and adding the organic solvent to the mixed solution thereby effecting flow type displacement of water with the added organic solvent is commercially employed. The displacement of the water by such a method as mentioned above can be efficiently carried out until the water content in the zirconia sol is lowered approximately below 1% by weight. This water content is sufficient for the zirconia sol to be used safely as a coating agent. When the method of displacement is required to lower the water content further below the level mentioned above, this method is effectively performed in the presence of a water adsorbent such as, for example, molecular sieve, calcium carbonate, or aluminum phosphate.

The organic solvents which are effectively used for the purpose of the displacement in the present invention include ketones such as acetone and methylethyl ketone; carboxylic acids such as sformic acid and acetic acid and esters such as ethyl acetate and methyl formate; alcohols such as methanol, ethanol, and isopropanol: polyhydric alcohols such as ethylene glycol and glycerol and esters such as methyl cellosolve and ethyl cellosolve; and hydrophilic organic solvents such as glycolic acid and malic acid which possess such hydrophilic groups as —COOH and —OH group in the molecular units thereof, for example. One member or a combination of two or more members selected from the group of organic solvents mentioned above may be used. By the displacement of the aqueous solvent with such an organic solvent, the sol is not recognized to induch such adverse phenomena as gelation and opacification and the transparent organic solvent-dispersed zirconia sol can be obtained invariably from the acidic type and neutral type zirconia sols in aqueous solvent.

The organic solvent-dispersed zirconia sol produced as described above can contain the zirconia sol up to a concentration of 25% by weight as $ZrO_2$. It can be stored stably for at least 6 months without any discernible inclination to increase of viscosity. When the organic solvent-dispersed zirconia sol of the present invention is used as a coating agent, it may incorporate therein an alcohol such as ethyl alcohol or isopropanol for the purpose of adjusting viscosity, it may be mixed with a powder such as of zirconia, titania, alumina, silicon carbide, or zircon and transformed into a coating slurry for the purpose of improving the hardness of an applied coating film and other physical properties to the extent of allowing formation of a coating film of large thickness, or it may be combined with such a pigment as iron oxide or cobalt for the purpose of allowing production of a color coating film.

It is naturally possible to prepare an organic solvent-dispersed zirconia type sol by preparatorily forming a zirconia type sol having incorporated therein a compound of a metallic element other than zirconium as described above and subjecting this zirconia type sol to the displacement of water with an organic solvent by the same method as described above. When the organic solvent-dispersed zirconia sol is prepared for a coating solution, it may be transformed into an organic solvent-dispersed zirconia type sol by incorporating therein the compound of a metallic element other than zirconium. In this case, a chelating agent may be added thereto, when necessary, as described above.

A coating solution is prepared by using as its base the organic solvent-dispersed zirconia sol or zirconia type sol and then applied in the form of a coating to a substrate. This application of the coating may be effected by spraying, brushing, dipping, spinning, or rolling, for example. The thickness of one layer of coating ranges from the order of submicrons obtained by the spinning method to the order of several hundreds of microns obtained by the rolling method. A plurality of coating layers may be superposed in a stratified form. The superposition is made after the underlying coating layer has been dried or subjected to a heat treatment.

The treatment of the surface of the substrate for ensuring the fastness of adhesion of the coating film to the substrate can be performed by the conventional method. Where simplicity forms an important consideration, this treatment may be effected by washing the coating surface of the substrate with pure water or an alcohol. The surface of a metallic substrate is preferable to be thoroughly defatted by washing with an alkali. When the coating film is desired to be formed in a large thickness, the adhesion of this thick coating film can be obtained with great fastness by having the coating surmate treated in advance by blasting. The coating solution according with the present invention is susceptible only sparingly to the influences of such atmospheric conditions as the moisture in the air and, therefore, is allowed to produce a homogeneous coating film without requiring any special consideration in the coating step.

The coating film thus formed is then dried and gelled. When the coating film has a small thickness, it can be rapidly dried and gelled at room temperature in the open air. When it has a large thickness, it is dried at a temperature in the range of 15° to 80° C. for a period of 1 to 24 hours. In this case, for the prevention of the coating film from sustaining a crack, it is necessary to adjust the speed of drying. The humidity-controlled drying method can be employed for this purpose.

Though the gelled coating film of the present invention is amorphous, the properties thereof such as hardness of film and fastness of adhesion satisfy the standards specified for practical use of the film. When the coating film is applied to plastic substrates which are incapable of tolerating heating at high temperatures, these properties of the coating film are preferable to be further enhanced. Under such harsh conditions, the organic solvent-dispersed zirconia sole prepared from the acidic type zirconia sol of the present invention is used and the coating film consequently obtained is dried in an atmosphere of ammonia gas or this coating film is exposed to an alkaline substance before it is dried. Otherwise, the method of alternately applying the coating film of the organic solvent-dispersed zirconia sol prepared from the neutral type zirconia sol and that from the acidic type zirconia sol can be carried out effectively.

The gelled coating film is then subjected to a heat treatment. The temperature and the time for this heat treatment are decided in due consideration of the resistance of the substrate to heat. When the physical properties of the coating film such as hardness are required to be enhanced, the temperature for the heat treatment is fixed above 400° C.

Now, the present invention will be described more specifically below with reference to working examples.

EXAMPLE 1

In a vessel heated to about 50° C., zirconyl carbonate was placed and ammonium hydrogen carbonate was gradually added thereto and stirred therewith to be dissolved therein. The resultant solution was passed through a filter paper to be deprived of insolubles and then combined with pure water, to prepare an aqueous solution of zirconyl ammonium carbonate having a concentration of 10% by weight as zirconia and a pH value of 8.9. A part of the aqueous solution was diluted with pure water to a concentration of 0.2 mol % as zirconia, to produce a raw material for the preparation of a sol.

This aqueous solution as the raw material was heated to about 50° C., pumped into a tubular reaction vessel heated in advance to 90° C., and passed therethrough at a rate equivalent to a retention time of about 2.5 minutes, to be hydrolyzed. The reaction solution flowing out of the reaction vessel was immediately cooled to below 50° C., to obtain a transparent zirconia sol.

This transparent zirconia sol was then placed in an ultrafiltration device, pure water was introduced into the system and, at the same time, unwanted ions present in the sol were discharged together with spent water from the system, to effect continuous washing of the sol. This washing was continued until the discharged spent water ceased to show any sign of the presence of carbonic acid ion. Then, the sol was concentrated to 12% by weight as zirconia.

The sol resulting from the washing and concentration mentioned above and glycolic acid added thereto in an amount to give a glycolic acid (mol number)/zirconia (mol number) ratio of 0.2/1 were stirred under a vacuum and, at the same time, heated and concentrated at a temperature below 50° C., to give rise to a transparent highly concentrated zirconia sol having a concentration of 20% by weight and a pH value of 7.2.

The transparent highly concentrated zirconia sol thus obtained was stable in the neutral to alkaline regions of pH and retained this stability for more than 6 months without any increase in viscosity.

EXAMPLE 2

A commercially available aqueous solution of zirconyl ammonium carbonate was diluted with pure water to a concentration of 0.3 mol/liter as $ZrO_2$. In a stirring tank type reaction vessel, the diluted aqueous solution of zirconyl ammonium carbonate was heated at 70° C. for 45 minutes and immediately thereafter cooled to below 50° C., to obtain a transparent zirconia sol. This sol and citric acid added thereto in an amount to give a citric acid (mol number)/zirconia (mol number) ratio of 1/1 were washed and concentrated in the same manner as in Example 1 and then heated and concentrated and, at the same time, stirred at a temperature below 40° C., to produce a transparent highly concentrated zirconia sol having a concentration of 25% by weight and a pH value of 7.8.

The transparent highly concentrated zirconia sol was stable in the neutral to alkaline regions of pH and retained this stability for more than 6 months without any increase in viscosity.

EXAMPLE 3

In a flask having an inner volume of 10 liters, 13,000 g of a commercially available aqueous solution of zirconyl ammonium carbonate having a concentration of 13% by weight as $ZrO_2$. To the aqueous solution, 1,040 g of glycolic acid was gradually added as stirred. In this while, an odorless gas was generated. Then, the flask was heated with a mantle heater to hydrolyze the reaction solution therein. When the temperature of the reaction solution was in a range of 50° to 60° C., the reaction solution began to emit a gas of the smell of ammonia. As the temperature was further elevated, the reaction solution effervesced vigorously. The reaction proceeded then with evolution of gases such as ammonia and carbon dioxide gas originating in the unwanted ions present in the sol. When the reaction was continued at a temperature of about 100° C. for about 3 hours, the effervescence subsided. The heating of the flask was continued further for 12 hours with pure water added suitably to the flask, to produce a zirconia sol having a concentration of 35% by weight as $ZrO_2$ and a pH value of 7. This sol was stable for a long time.

EXAMPLE 4

A zirconia sol having a concentration of 30% by weight as $ZrO_2$ was obtained by following the procedure of Example 1, excepting 840 g of tartaric acid was added in the place of glycolic acid. Then, the sol was led to a filtration device having set therein an ultrafiltration membrane about 4,000 m² in total filtration area, combined with water, and passed through the membrane. The filtration and washing was continued, with the filtrate discharged from the system. After the washing, the sol was adjusted to a concentration of 30% by weight as $ZrO_2$, to produce a highly purified sol of pH 6.9 stable for a long time.

REFERENTIAL EXAMPLE

A slurry was prepared by stirring and adding 2 parts by weight of 200-mesh calcium carbonate to 1 part by weight of the zirconia sol prepared in Example 3. This slurry was stirred and kept at room temperature to test for stability to withstand aging. It retained very high stability for more than 1 month without any increase in viscosity.

Control

To 200 liters of pure water, 30 kg of an aqueous solution of zirconium nitrate having a concentration of 18% by weight as ZrkO2 and 3 kg of urea were added. Then, the resultant aqueous solution was heated to produce a transparent zirconia sol. This sol was cooled and then concentrated to 10% by weight as $ZrO_2$ by the use of an ultrafiltration device. This sol was further heated and concentrated under a vacuum at a temperature below 50° C., to produce a transparent zirconia sol having a concentration of 25% by weight. This zirconia sol had a pH Value of 1.5 and retained stability for a long time.

A slurry was prepared by stirring and adding 1 part by weight of 200-mesh calcium carbonate to 1 part by weight of this sol. This slurry was thoroughly gelled after 10 minutes standing and could be no longer used as a slurry.

EXAMPLE 5

To 200 liters of pure water, 30 kg of an aqueous solution of zirconyl nitrate having a concentration of 18% by weight as $ZrO_2$ and 3 kg of urea were added. Then, the resultant aqueous solution was boiled for 6 hours, to produce a transparent zirconia sol. This sol was cooled and then concentrated to 10% by weight as $ZrO_2$ by the use of an ultrafiltration device. The concentrated sol was diluted with pure water to the same zirconia concentration as before the ultrafiltration and again concentrated by the use of the ultrafiltration membrane. This washing was repeated to a total of five cycles. The sol of a concentration of 10% by weight as $ZrO_2$ obtained after the final washing was heated and concentrated under a vacuum at a temperature below 50° C., to produce a transparent zirconia sol having a concentration of 20% by weight. This zirconia sol possessed a pH value of 1.5 and a viscosity of 40 cp and retained stability for a long time.

EXAMPLE 6

In a flask having an inner volume of 10 liters, 13 kg of a commercially available aqueous solution of zirconyl ammonium carbonate having a concentration of 13% by weight was placed. To the aqueous solution, 1,040 g of glycolic acid was gradually added as stirred. Then, the flask was heated with a mantle heater to induce hydrolysis of the reaction solution therein. When the temperature of the reaction solution reached a range of 50° to 60° C., the reaction solution began to emit a gas of the smell of ammonia. As the temperature was further elevated, the reaction solution effervesced vigorously. The reaction proceeded with evolution of such gases as ammonia and carbon dioxide gas originating in the unwanted ions present in the sol.

When the reaction solution was heated at a temperature of about 100° C. for about 3 hours, the effervescence subsided. To the reaction solution in the ensuant state, an aqueous solution of yttrium acetate was gradually added to a concentration of 3 mol % as $Y_2O_3$ based on $ZrO_2$. After this addition, the heating was further continued for 12 hours with pure water suitably added to the flask, to produce a zirconia type sol having a concentration of 30% by weight as $ZrO_2$ and incorporating therein 3 mol % of $Y_2O_3$ based on $ZrO_2$. This sol was transparent, possessed a pH value of 7 and a viscosity of 35 cp, and retained stability for a long time.

EXAMPLE 7

A homogeneous solution was obtained by dissolving 345 g of ethylene glycol monoethyl ether in 300 g of zirconia sol prepared in Example 5. The solution was distilled to expel a gas formed mainly of steam from the system and effect displacement of the water present in the sol with ethylene glycol monoethyl ether. The heating was stopped when the temperature of the reaction solution reached 124.3° C., to produce a zirconia sol dispersed in ethylene glycol monoethyl ether and having a concentration of 18% by weight as $ZrO_2$. This sol had a transparent appearance, possessed a water content of 3.5% by weight and a viscosity of 20 cp, and retained stability for more than 6 months.

EXAMPLE 8

A homogenous solution was obtained by dissolving 370 g of ethylene glycol in 300 g of zirconia type sol prepared in Example 6. The water in the sol was displaced with ethylene glycol by repeating the procedure of Example 7. The heating was stopped when the temperature of the solution reached 197° C., to produce a sol dispersed in ethylene glycol and having a concentration of 25% by weight as $ZrO_2$ and incorporating therein 3 mol % of ytrrium as $Y_2O_3$ based on zirconia. The sol had a transparent appearance, possessed a water content of 1% by weight and a viscosity of 65 cp, and retained stability for more than 6 months.

EXAMPLE 9

A solution of 500 g of zirconia sol prepared in Example 5 in isopropyl alcohol was placed in a receptacle of an ultrafiltration device. The ultrafiltration of the solution was continued with isopropyl alcohol added to the receptacle by way of replenishment. Thus, the displacement of the water present in the sol with isopropyl alcohol was effected with expulsion of a mixed solution of water and isopropyl alcohol from the system, to produce a zirconia sol dispersed in isopropyl alcohol and having a concentration of 15% by weight as $ZrO_2$. This sol had a transparent appearance, possesses a water content of 2% by weight and a viscosity of 40 cp, and retained stability for more than 6 months.

EXAMPLE 10

A coating solution having a concentration of 12% by weight as $ZrO_2$ was prepared by adding isopropyl alcohol to 100 g of a zirconia sol prepared in Example 7 as dispersed in ethylene glycol monoethyl ether. A quartz glass defatted in advance with acetone was coated with the coating solution by being immersed in the coating solution and then pulled up at a fixed speed of 3.5 cm/min. Then, the wet quartz glass was dried in the open air at room temperature to form a gelled film of the coating solution on the surface of the quartz glass. When the quartz glass thus dried was heat-treated in the open air at 400° C. for 30 minutes, a colorless transparent coating film 0.14 μm in thickness showing an interference color was formed on the surface of the quartz glass. To test the coating film for crystallinity, a part of the coating solution was cast in a broad-bottom vessel made of glass and dried at a controlled drying speed, to produce a transparent gelled sheet sample 0.1 mm in thickness. By heat-treating this sample under the same conditions as those used for the aforementioned coating film, a transparent thin sheet of zirconia was obtained.

An electron micrograph of this thin sheet clearly showed that this thin sheet was composed of microcrystals. An X-ray diffraction pattern of this thin sheet showed that these microcrystals were mostly of the tetragonal system.

EXAMPLE 11

A coating solution having a concentration of 10% by weight was prepared by adding to the zirconia sol prepared in Example 7 as dispersed in ethylene glycol monoethyl ether such an amount of tungsten ethoxide as to give a $WO_3$ concentration of 10% by weight based on $ZrO_2$ and ethanol. On a quartz glass defatted in advance with acetone, the coating solution was applied by the spin coating method. By drying and then heat-treating the coating at 400° C., a $WO_3$-doped transparent zirconia film of the tetragonal system was obtained. This composite film was used for improving the electric properties such as electric resistance or the optical properties of the zirconia film.

EXAMPLE 12

Three hundred (300) g of the yttrium-containing zirconia sol prepared in Example 8 as dispersed in ethylene glycol and 75 g of isopropyl alcohol and 25 g of an acrylic type organic binder added thereto were thoroughly stirred. In a ball mill, the resultant solution and 240 g of a zirconia powder partially stabilized with yttria having a particle diameter of 325 mesh under were mixed for 16 hours. The slurry consequently obtained was applied repeatedly with a brush on a porous zirconia plate. The applied layer of the slurry was dried and calcined at 1200° C. Thus, on the porous plate, a layer of dense texture and smooth surface 1 mm in thickness was deposited. The porous sheet was no longer pervious to a gas. In a heat cycle test by alternate heating to above 1000° C. and cooling to room temperature, the coating layer showed no discernible sign of crack or separation and proved itself to be usable for a firing setter, for example.

We claim:

1. A zirconia sol, comprising a transparent zirconia sol obtained by hydrolysis of zirconyl ammonium carbonate having a concentration in the range of 10 to 25% by weight as $ZrO_2$ and a chelating agent incorporated in said transparent zirconia sol wherein the amount of chelating agent is such that the chelating agent (mol number)/zirconia (mol number) ratio is in the range of 0.02/1 to 4/1.

2. A zirconia sol according to claim 1, wherein said chelating agent is at least one member selected from the group consisting of oxyphenols, amino alcohols, oxyacids, polycarboxylic acids and esters thereof, oxyaldehydes, amino acids, $\beta$-diketones, and $\alpha$-, $\beta$- and $\gamma$-ketonic acids and esters thereof.

3. A zirconia sol according to claim 1, wherein said transparent zirconia sol is a transparent highly concentrated zirconia sol obtained by washing and concentrating with an ultrafiltration membrane a transparent zirconia sol obtained by hydrolysis of zirconyl ammonium carbonate.

4. A zirconia sol according to claim 1, wherein said transparent zirconia sol is a transparent highly concentrated zirconia sol obtained by washing and concentrating with an ultrafiltration membrane a transparent zirconia sol obtained by hydrolysis of zirconyl ammonium carbonate and subsequently heating and further concentrating the resultant zirconia sol at a temperature below 80° C.

5. A zirconia sol according to claim 1, wherein said chelating agent is at least one member selected fro mthe group consisting of oxyacids and $\beta$-diketones.

6. A zirconia sol, produced by hydrolyzing the reaction product of zirconyl ammonium carbonate with a chelating agent wherein the amount of chelating agent is such that the chelating agent (mol number)/zirconia (mol number) is in the range of 0.02/1 to 4/1.

7. A zirconia sol according to claim 6, wherein said chelating agent is at least one member selected from the group consisting of oxyphenols, amino alcohols, oxyacids, polycarboxylic acids and esters thereof, oxyaldehydes, amino acids, $\beta$-diketones, and $\alpha$-, $\beta$- and $\gamma$-ketonic acids and esters thereof.

8. A zirconia sol according to claim 6, which is produced by washing and concentrating with an ultrafiltration membrane a zirconia sol obtained by hydrolyzing the reaction product of zirconyl ammonium carbonate with a chelating agent.

9. A zirconia sol according to claim 6, wherein said chelating agent is at least one member selected from the group consisting of oxyacids and $\beta$-diketones.

10. An organic solvent-dispersed zirconia sol, produced by adding an organic solvent to a water-dispersed zirconia sol thereby displacing the water with said organic solvent.

11. An organic solvent-dispersed zirconia sol according to claim 10, using a zirconia sol produced from an aqueous solution of a zirconium salt and urea.

12. An organic solvent-dispersed zirconia sol according to claim 10, using a zirconia sol obtained by hydrolyzing the reaction product of zirconyl ammonium carbonate with a chelating agent.

13. An organic solvent-dispersed zirconia sol according to claim 12, wherein said chelating agent is at least one member selected from the group consisting of oxyphenols, amino alcohols, oxyacids, polycarboxylic acids and esters thereof, oxyaldehydes, amino acids, $\beta$-diketones, and $\alpha$-, $\beta$-, and $\gamma$-ketonic acids and esters thereof.

14. An organic solvent-dispersed zirconia sol according to claim 10, wherein said organic solvent is a hydrophilic organic solvent.

15. A method for the production of an organic solvent-dispersed zirconia sol, which comprises adding an organic solvent to a zirconia sol produced from an aqueous solution of a zirconium salt and urea or a zirconia sol obtained by hydrolyzing the reaction product of zirconyl ammonium carbonate with a chelating agent and subjecting the resultant mixed solvent-dispersed zirconia sol to distillation or to the treatment with an ultrafiltration membrane thereby effecting displacement of the water with said organic solvent.

16. A method according to claim 15, wherein said chelating agent is at least one member selected from the group consisting of oxyphenols, amino alcohols, oxyacids, polycarboxylic acids and esters thereof, oxyaldehydes, amino acids, $\beta$-diketones, and $\alpha$-, $\beta$- and $\gamma$-ketonic acids and esters thereof.

17. A method according to claim 16, wherein said organic solvent is a hydrophilic organic solvent.

18. A method for the production of a transparent zirconia sol, which comprises hydrolyzing an aqueous solution of zirconium ammonium carbonate, washing and concentrating the resultant sol with an ultrafiltration membrane, and adding a chelating agent at a time between the time preceding the formation of said sol and the time following the formation.

19. The method according to claim 18, wherein the amount of said chelating agent to be added is such that the chelating agent (mol number)/zirconia (mol number) ratio is in the range of 0.02/1 to 4/1.

20. The method according to claim 18, wherein said chelating agent is at least one member selected from the group consisting of oxyphenols, amino alcohols, oxyacids, polycarboxylic acids and esters thereof, oxyaldehydes, amino acids, beta-diketones, and alpha-, beta- and gamma-ketonic acids and esters thereof.

21. The method according to claim 20, wherein said chelating agent is at least one member selected from the group consisting of oxyacids and beta-diketones.

22. The method according to claim 18, wherein said hydrolysis is carried out at a temperature in the range of 60° C. to 120° C.

23. The method according to claim 18, further comprising heating said concentrated sol at a temperature below 80° C.

24. The method for the production of a zirconia sol, which comprises preparing an aqueous solution of zirconyl ammonium carbonate and a chelating agent, mixing said solution to react, and hydrolyzing the resultant reaction product under application of heat to produce said zirconia sol.

25. The method according to claim 24, wherein the amount of said chelating agent to be added is such that the chelating agent (mol number)/zirconia (mol number) ratio is in the range of 0.02/1 to 4/1.

26. The method according to claim 24, wherein said chelating agent is at least one member selected from the group consisting of oxyphenols, amino alcohols, oxyacids, polycarboxylic acids and esters thereof, oxyaldehydes, amino acids, beta-diketones, and alpha-, beta- and gamma-ketonic acids and esters thereof.

27. The method according to claim 26, wherein said chelating agent is at least one member selected from the group consisting of oxyacids and beta-diketones.

28. The method according to claim 24, wherein said hydrolysis is carried out at a temperature in the range of 60° to 300° C.

29. The method according to claim 24, further comprising washing and concentrating the resultant sol with an ultrafiltration membrane.

* * * * *

UNITED STATES PATENT AND TRADEMARK OFFICE
CERTIFICATE OF CORRECTION

PATENT NO. : 5,234,870
DATED : August 10, 1993
INVENTOR(S) : Shigemi OSAKA et al It is certified that error appears in the above-indentified patent and that said Letters Patent is hereby corrected as shown below:

On title page
  in item [30], delete "July 21, 1988" and insert -- July 21, 1989 --.

Signed and Sealed this

Twenty-second Day of March, 1994

Attest:

BRUCE LEHMAN

*Attesting Officer*    *Commissioner of Patents and Trademarks*